Patented Oct. 21, 1947

2,429,439

UNITED STATES PATENT OFFICE 2,429,439

METHOD OF PRODUCING BUTADIENE STYRENE COPOLYMER REINFORCED WITH CALCIUM SILICATE

Jerome C. Westfahl, Daniel S. Sears, and John W. Martindale, Cuyahoga Falls, Ohio, assignors to The B. F. Goodrich Company, New York, N. Y., a corporation of New York No Drawing. Application January 20, 1945, Serial No. 573,810

2 Claims. (Cl. 260—41)

This invention relates to the compounding of synthetic rubber of the type prepared by the copolymerization in aqueous emulsion of a butadiene-1,3 hydrocarbon with an unsaturated organic compound which contains a single olefinic double bond and is copolymerizable therewith, in aqueous emulsion, and more particularly to a method whereby precipitated inorganic pigments may be intimately associated with such synthetic rubbers to produce reinforced synthetic rubber compositions of improved properties.

In the compounding of rubber, either natural or synthetic, for use in the manufacture of numerous useful articles such as vehicle tires and tubes, it is generally desirable to admix the rubber with a finely-divided or powdered substance, known to the art as a reinforcing pigment, which is readily dispersed in the rubber by ordinary mixing procedures such as by the use of a mixing mill, and which physically combines therewith to produce a reinforced rubber composition superior in strength and other properties to the rubber alone.

The effectiveness of any given substance as a reinforcing pigment for rubbery materials, however, depends upon the particular kind of rubber with which the pigment is used; some pigments, the carbon blacks for example, are useful in reinforcing both natural and synthetic rubbers but are somewhat more effective with certain synthetic rubbers, while other pigments are quite valuable in reinforcing natural rubber and some synthetic rubbers, but have heretofore been of little practical use in reinforcing other synthetic rubbers.

Precipitated calcium silicate and similar precipitated inorganic pigments are examples of pigments of this latter type. Although such materials substantially reinforce natural rubber when admixed therewith in any desired manner, it has heretofore not been possible effectively to utilize them with synthetic rubbers of the type prepared by the emulsion copolymerization of butadiene-1,3 hydrocarbons with copolymerizable compounds such as styrene, since they are not readily dispersed in such butadiene-1,3 copolymer synthetic rubbers by ordinary mixing procedures and since the compositions so obtained are generally deficient in tensile strength and other desirable properties.

We have now discovered a method whereby calcium silicate and other precipitated pigments may be easily and efficiently incorporated in butadiene-1,3 copolymer synthetic rubbers to produce reinforced compositions having high tensile strength and other desirable properties. This method consists essentially in treating an aqueous dispersion or latex of butadiene-1,3 copolymer synthetic rubber such as is obtained by the copolymerization in aqueous emulsion of a butadiene-1,3 hydrocarbon and a copolymerizable compound, with aqueous solutions of water-soluble salts which react to form a precipitate, in such a manner that precipitation of the pigment occurs simultaneously with coagulation of the dispersion, and an aqueous slurry is formed, containing finely-divided crumbs of synthetic rubber composition in which particles of precipitated pigment are intimately associated with particles of the synthetic rubber. The crumbs are filtered, washed, dried and formed into a sheet which may then be otherwise compounded and vulcanized in the usual manner to produce synthetic rubber vulcanizates in which the precipitated pigment reinforces the synthetic rubber and improves the properties thereof.

It is quite surprising that butadiene-1,3 copolymer synthetic rubbers should be thus reinforced with precipitated pigments, in view of the recognized ineffectiveness of such pigments in reinforcing such synthetic rubbers when incorporated therewith by ordinary procedures, and in view of the fact that the reinforcement of natural rubber with precipitated pigments obtained by treating natural rubber latex in a similar way, is not appreciably different from the reinforcement of natural rubber secured by incorporating such pigments therein in the ordinary way.

The method of this invention is of particular importance in the preparation of compositions in which calcium silicate or some other precipitated pigment is associated with the synthetic rubber obtained by the copolymerization of butadiene-1,3 and styrene. Accordingly, the invention will be illustrated with specific relation to this preferred embodiment in the following examples:

*Example 1*

A synthetic rubber latex prepared by the copolymerization in aqueous emulsion of a mixture of 75 parts of butadiene-1,3 and 25 parts of styrene and consisting of 80 parts of synthetic rubber particles dispersed in 225 parts of a 2% aqueous fatty acid soap solution (making a total of 315 parts of latex of which about 25.4% is synthetic rubber solids) is stabilized against oxidation by the addition thereto with stirring of 8.9 parts of an aqueous emulsion containing 1.6 parts of heptylated diphenyl amine (or some equivalent antioxidant such as phenyl beta naphthylamine, hydroquinone, beta-naphthol and various other aryl amines and phenols) emulsified in an aqueous medium; and is then admixed with stirring with 89.6 parts of a sodium silicate solution (having a specific gravity of 1.45 and containing about 40% of sodium silicate) diluted with 209 parts of water. The resulting mixture of latex and sodium silicate solution contains the synthetic rubber particles dispersed in the aqueous phase and is free-flowing and quite fluid in character, coagulation of the latex not being effected by the addition of the diluted sodium silicate solution. This mixture is then added in a slow steady stream and with constant stirring to 821.2 parts of an aqueous solution of calcium chloride containing 21.2 parts of $CaCl_2 \cdot 2H_2O$ (an amount of calcium chloride in slight excess over that required to react with all the sodium silicate in the latex). Upon this addition, calcium silicate is precipitated (by the reaction of the sodium silicate and the calcium chloride) and simultaneously therewith the synthetic rubber latex is coagulated (by the action of the calcium chloride solution and/or the sodium chloride formed from the reaction of sodium silicate and calcium chloride); and there is formed an aqueous slurry containing small crumbs (about .001 mm. in size) of synthetic rubber containing (as shown by microscopic examination) calcium silicate particles intimately associated with and evenly dispersed in the synthetic rubber. The slurry is then filtered (having first been diluted with additional water to facilitate handling, if desired); the filter cake is washed repeatedly (reslurrying with additional water, if desired) and is then removed from the filter and dried in a vacuum drier at 105° C. for 8 to 10 hours. There is thus obtained 108 parts (a substantially quantitative yield) of a masterbatch containing about 28.0% of calcium silicate and about 72.0% of butadiene-1,3 styrene synthetic rubber (including a small amount of antioxidant and of soap), or 39 parts of calcium silicate to 100 parts of synthetic rubber.

To illustrate the reinforcement of the synthetic rubber by the calcium silicate pigment in this composition, 139 parts of the masterbatch is admixed on a mixing mill with 2.5 parts of zinc oxide, 2 parts of stearic acid, 10 parts of a tarry softener, 1.5 parts of benzothiazyl-2 disulfide (a vulcanization accelerator) and 3 parts of sulfur; and the resulting composition is vulcanized for 45 minutes at 280° F. The vulcanizate obtained possesses a tensile strength of 1500 lbs./sq. in., a value considerably higher than that of a composition not containing calcium silicate. However, when a composition containing 100 parts of butadiene-1,3 styrene synthetic rubber (also containing a small amount of antioxidant and of soap), 39 parts of fine particle size precipitated calcium silicate, 2.5 parts of zinc oxide, 2 parts of stearic acid, 10 parts of tarry softener, 1.5 parts of benzothiazyl-2 disulfide and 3 parts of sulfur, is prepared by admixing all the ingredients (including the calcium silicate) on a mixing mill and is vulcanized for 45 minutes at 280° F., the resulting vulcanizate possesses a tensile strength of only 1,000 lbs./sq. in., there being little improvement in tensile strength brought about by the calcium silicate.

Example 2

A diluted sodium silicate solution is prepared by admixing 914 parts of sodium silicate solution containing about 45% of sodium silicate with 870 parts of water and is added to 1800 parts of a butadiene-1,3 styrene synthetic rubber latex prepared by the copolymerization in aqueous emulsion of a mixture of 75 parts of butadiene-1,3 and 25 parts of styrene and containing about 37.5% of synthetic rubber particles stabilized by the presence of an antioxidant. The resulting fluid mixture and a solution of 170 parts of 80% calcium chloride in 3500 parts of water are then simultaneously added in separate streams to a receptacle containing 15,000 parts of water, with constant agitation of the contents of the receptacle during the addition. An aqueous slurry containing crumbs of synthetic rubber coagulum intimately associated with precipitated calcium silicate is formed, which is then filtered (a clear filtrate being obtained) and the filter cake washed and dried to produce a substantially quantitative yield of a composition containing 60 parts of calcium silicate to 100 parts of the synthetic rubber.

A sample of this synthetic rubber calcium silicate masterbatch is then compounded in the recipe set forth in Example 1 using 160 parts of the masterbatch and the same quantities of the other ingredients as stated in Example 1. When vulcanized at 280° F., this composition yields a vulcanizate having an ultimate tensile strength of over 2,000 lbs./sq. in., but a vulcanizate obtained from an identically compounded composition in which all ingredients (including 60 parts of calcium silicate to 100 parts of the synthetic rubber) are incorporated into the composition by milling, possesses an ultimate tensile strength of only 1,400 lbs./sq. in. Moreover, the vulcanizate obtained from the composition produced in accordance with this example possesses a Crescent tear resistance of 14.6 lbs. as compared to a tear resistance of about 10 lbs. for the vulcanizate from the composition in which the calcium silicate was milled into the synthetic rubber.

It is apparent from the foregoing examples that the incorporation of calcium silicate pigment in synthetic rubber by simultaneous precipitation of the pigment and coagulation of synthetic rubber latex, yields compositions much superior to compositions in which the pigment is incorporated by ordinary methods of mixing. In the former compositions the pigment greatly reinforces the synthetic rubber improving its tensile strength, tear resistance and other properties such as abrasion resistance and resistance to flex-cracking, while in the latter compositions the pigment acts merely as a filler. Accordingly, compositions of the type illustrated in the examples are of considerable value in the manufacture of inner tubes, water curing bags, tires (being especially adaptable for white sidewalls because of their light color), and for numerous other applications where ordinary synthetic rubber compositions such as compositions reinforced with carbon black are not entirely suitable.

Moreover, as is also apparent from the examples, this method of incorporating precipitated pigments in synthetic rubber is quite advantageous from the standpoint of efficiency and economy of processing of the synthetic rubber since the precipitation and incorporation of the pigment with the rubber occurs simultaneous with the coagulation operation (a necessary operation in the processing of synthetic rubber made by emulsion polymerization) and thereby eliminates a substantial portion of the time and energy required in admixing pigments with rubber in the rubber factory. A further advantage of this method of procedure is that it is possible to incorporate large quantities of pigment with synthetic rubber without loss of any appreciable quantity of material, a result which is not always possible when synthetic latex is compounded with dispersions of compounding ingredients and the compounded latex then coagulated. For example, the addition of an aqueous dispersion of preformed insoluble pigment to synthetic rubber latex followed by coagulation of the latex, produces a coagulum containing only a small proportion of the total amount of added pigment, and the pigment which is separated with the synthetic rubber is not nearly so intimately and evenly dispersed in the rubber as in the method of this invention.

Although the examples are illustrative of the preferred methods of practicing the invention, numerous variations and modifications may be effected in the kinds and amounts of materials therein used and in the procedures therein employed while still obtaining the advantages described.

Many synthetic rubber latices are equivalent for the purposes of this invention to the synthetic rubber latex used in the examples, which latex is prepared by the copolymerization, in an aqueous emulsion containing fatty acid soap as the emulsifying agent, of a mixture of 75 parts of butadiene-1,3 and 25 parts of styrene, and may be substituted therefor with equivalent results. Thus, latices prepared by using any desired ratio of butadiene-1,3 to styrene, but preferably a ratio of 1 part of butadiene-1,3 to $\frac{1}{10}$ to 2 parts of styrene; latices prepared by substituting all or a part of the butadiene-1,3 with other butadiene-1,3 hydrocarbons such as isoprene, 2,3-dimethyl butadiene-1,3, piperylene 3-methyl-pentadiene-1,3 or the like; latices prepared by substituting all or a part of the styrene with other organic compounds which contain a single olefinic double bond and which are well known to be copolymerizable with butadiene-1,3 hydrocarbons in aqueous emulsion, including other compounds containing a methylene ($CH_2$) group attached by the olefinic double bond to a carbon atom in turn attached to a negative group free from olefinic double bonds, such as an aromatic radical, a heterocyclic radical containing an unsaturated linkage, a cyano radical, a carbonyl radical, or a halogen radical, examples of which compounds include, in addition to styrene, such other compounds as vinyl naphthalene, meta-chloro styrene, 3,5-dichloro styrene, p-methoxy styrene, vinyl pyridine, acrylonitrile, alpha-chloro acrylonitrile, methyl acrylate, methyl methacrylate, methacrylamide, methyl vinyl ketone and the like, and also including other compounds copolymerizable with butadiene-1,3 hydrocarbons in aqueous emulsion and containing a single olefinic double bond such as diethyl fumarate, ethylene and isobutylene; latices prepared by substituting the fatty acid soap used as the emulsifying agent with other well known emulsifying agents such as rosin acid soaps, water-soluble alkyl sulfates and alkaryl sulfonates, high molecular weight organic bases such as dodecyl amine hydrochloride and the like; and latices prepared by making all or any number of these substitutions at the same time, may all be used in the practice of this invention. Moreover, such latices may contain added ingredients such as antioxidants, stabilizers, softeners or plasticizers and vulcanizing agents and various other compounding ingredients, if desired, but it is preferred that the latex contain only the synthetic rubber, together with a small amount of antioxidant, dispersed in an aqueous solution of an emulsifying or dispersing agent, when used in the practice of this invention.

It is also possible to effect numerous variations and modifications in the nature of the water-soluble salt solutions used to treat the synthetic latex so as to bring about simultaneous precipitation of an insoluble pigment and coagulation of the latex. These variations and modifications will of course depend primarily upon the particular pigment which it is desired to precipitate. If an insoluble silicate such as those of calcium, barium, strontium, magnesium aluminum and the heavy metals, is the desired precipitate, this may be formed by the reaction of an aqueous solution of a water-soluble silicate such as those of potassium and sodium with an aqueous solution of a water-soluble salt such as a chloride or nitrate of the appropriate metal, as in the precipitation of calcium silicate by the reaction of sodium silicate solution and calcium chloride solution in the examples. Other insoluble inorganic pigments may be similarly precipitated by reaction of aqueous solutions of two different water-soluble salts. For example, calcium carbonate may be precipitated by using an aqueous solution of sodium or ammonium carbonate or carbonic acid and an aqueous solution of a water-soluble calcium salt such as calcium chloride; barium sulfate may be precipitated by using an aqueous solution of water-soluble barium salt such as barium chloride and an aqueous solution of a water-soluble sulfate such as sodium sulfate; lead chromate may be precipitated by using an aqueous solution of a water-soluble lead salt such as lead nitrate and an aqueous solution of a water-soluble chromate such as sodium chromate; cadmium sulfide may be precipitated by using an aqueous solution of a water-soluble sulfide and an aqueous solution of a water-soluble cadmium salt; and numerous other water-insoluble inorganic pigments may be precipitated by using aqueous solutions of water-soluble salts which react to form a precipitate, as will be apparent to those skilled in the art.

The method of treating the synthetic latex with the aqueous solutions of water-soluble salts so as to effect simultaneous precipitation of a pigment and coagulation of the latex also may be varied, depending upon the materials used. If one of the aqueous solutions is of such a nature that its addition does not coagulate the latex, this solution may be first admixed in any desired manner with the latex before the latex is brought into contact with the other solution. This procedure is illustrated in the examples by the initial admixing of sodium silicate solution with the latex. Other water-soluble salts which have no appreciable coagulating effect on the latex are alkali metal and ammonium silicates, sulfides, acetates and carbonates, if in sufficiently dilute solution.

Many aqueous salt solutions such as solutions of salts of strong acids and strong bases and salts having polyvalent cations, however, even when in diluted form rapidly coagulate synthetic rubber latices. When such a solution is one of the solutions used to treat the latex, it is important that this solution not be brought into contact with the latex unless the other solution (which reacts to form the precipitated pigment) also be present. If this other solution is of the kind which does not coagulate the latex, the mixture of it and latex may be added to the aqueous solution having coagulating effect on the latex, as exemplified in Example 1, or these two liquids may be added simultaneously to water or to an aqueous solution of a coagulant such as a salt solution or a dilute acid solution, as exemplified in Example 2, or any other method of bringing the latex and non-coagulating solution into contact with the solution having coagulating effect may be employed. On the other hand, if both of the salt solutions to be employed are of such a nature that each of them alone coagulates the latex, the treatment of the latex with these solutions should be effected by simultaneously adding them to the latex (so that precipitation of the pigment occurs at the same time as coagulation of the latex) or by simultaneously adding the two solutions and latex to water or to an aqueous coagulating solution.

The concentrations of the salt solutions and of the latex may be varied as desired and depending, of course, upon the relative amounts of synthetic rubber and precipitated pigment desired in the composition. However, it is preferred, in order that the composition be obtained in a form in which it is more easily handled and in which the pigment and the synthetic rubber are most intimately associated, that the amount of precipitated pigment formed be no more than the amount of synthetic rubber coagulated, more preferably that the amount of pigment be about 10 to 80 parts to each 100 parts of synthetic rubber coagulated, and that the total amount of aqueous medium present during the simultaneous precipitation and coagulation be at least 10 times as great, and preferably from 10 to 30 times that of the total amount of precipitated pigment and synthetic rubber combined. These conditions may be met conveniently by utilizing dilute solutions of salts and latex of about 20 to 50% synthetic rubber content, as in the examples.

The simultaneous precipitation of an insoluble pigment and coagulation of synthetic rubber latex to form a slurry of finey-divided crumbs of synthetic rubber in which the pigment is evenly dispersed, is in general accomplished as described in the examples, when proceeding according to any of these variations and modifications. In some instances the coagulation may be brought about in whole or in part by one or both of the salt solutions employed; in other instances it may be brought about in whole or in part by the soluble salt also formed by the reaction to form the insoluble precipitate; while in still other instances it may be desirable to add the latex and the salt solutions to a coagulating solution such as a solution of an acid in order to insure complete coagulation. In any event and regardless of the exact coagulating means, the result is that a finely-divided crumb of coagulum containing the precipitated pigment is formed.

Filtering, washing and drying of the crumbs of synthetic rubber containing precipitated pigment may be effected in the manner described in the examples or by any other of the methods well known to the art. The crumbs may be sheeted, if desired, and the resulting sheet utilized as a masterbatch in the further compounding, in any desired manner and with any desired ingredients, of the synthetic rubber.

Numerous other variations and modifications may also be effected in the practice of the invention, such, for example, as carrying out the simultaneous precipitation of pigment and coagulation of the latex, either with or without transforming the resulting crumbs into a sheet, in a continuous manner, and all such variations and modifications are within the spirit and scope of the invention as defined in the appended claims.

We claim:
1. The method of producing a butadiene-1,3 styrene copolymer synthetic rubber reinforced with calcium silicate which comprises preparing an admixture of an aqueous solution of sodium silicate with a synthetic rubber latex resulting from the copolymerization in aqueous emulsion of 75 parts of butadiene-1,3 with 25 parts of styrene, preparing an aqueous solution of calcium chloride containing a quantity of calcium chloride in excess of that required to react with the sodium silicate in the sodium silicate latex mixture and simultaneously introducing into a reaction zone the said sodium silicate latex mixture and the said calcium chloride solution, the said mixture and solution being introduced as separate streams while agitating the material so introduced in the reaction zone, whereupon simultaneous precipitation of calcium silicate and coagulation of the latex occur in the reaction zone to form an aqueous slurry of butadiene-1,3 and styrene copolymer synthetic rubber in crumb-like form and containing calcium silicate intimately associated with the synthetic rubber.

2. The method of producing a butadiene-1,3 styrene copolymer synthetic rubber reinforced with calcium silicate which comprises preparing an admixture of an aqueous solution of a water-soluble silicate with a synthetic rubber latex resulting from the copolymerization in aqueous emulsion of 1 part of butadiene-1,3 with 0.1 to 2.0 parts of styrene, preparing an aqueous solution of a water-soluble calcium salt containing a quantity of the said salt in excess of that required to react with the silicate in the silicate latex mixture and simultaneously introducing into a reaction zone the said silicate latex mixture and the said calcium salt solution, the said mixture and solution being introduced as separate streams while agitating the material so introduced in the reaction zone, whereupon simultaneous precipitation of calcium silicate and coagulation of the latex occur in the reaction zone to form an aqueous slurry of butadiene-1,3 and styrene copolymer synthetic rubber in crumb-like form and containing calcium silicate intimately associated with the synthetic rubber.

JEROME C. WESTFAHL.
DANIEL S. SEARS.
JOHN W. MARTINDALE.

REFERENCES CITED

The following references are of record in the file of this patent:

UNITED STATES PATENTS

| Number | Name | Date |
|---|---|---|
| 1,953,972 | Murphy et al. | Apr. 10, 1934 |
| 2,367,629 | Teppema et al. | Jan. 16, 1945 |